Sept. 2, 1958 W. H. JACKSON 2,850,287
PIPE NIPPLE THREADING JIG
Filed Feb. 3, 1956 3 Sheets-Sheet 1
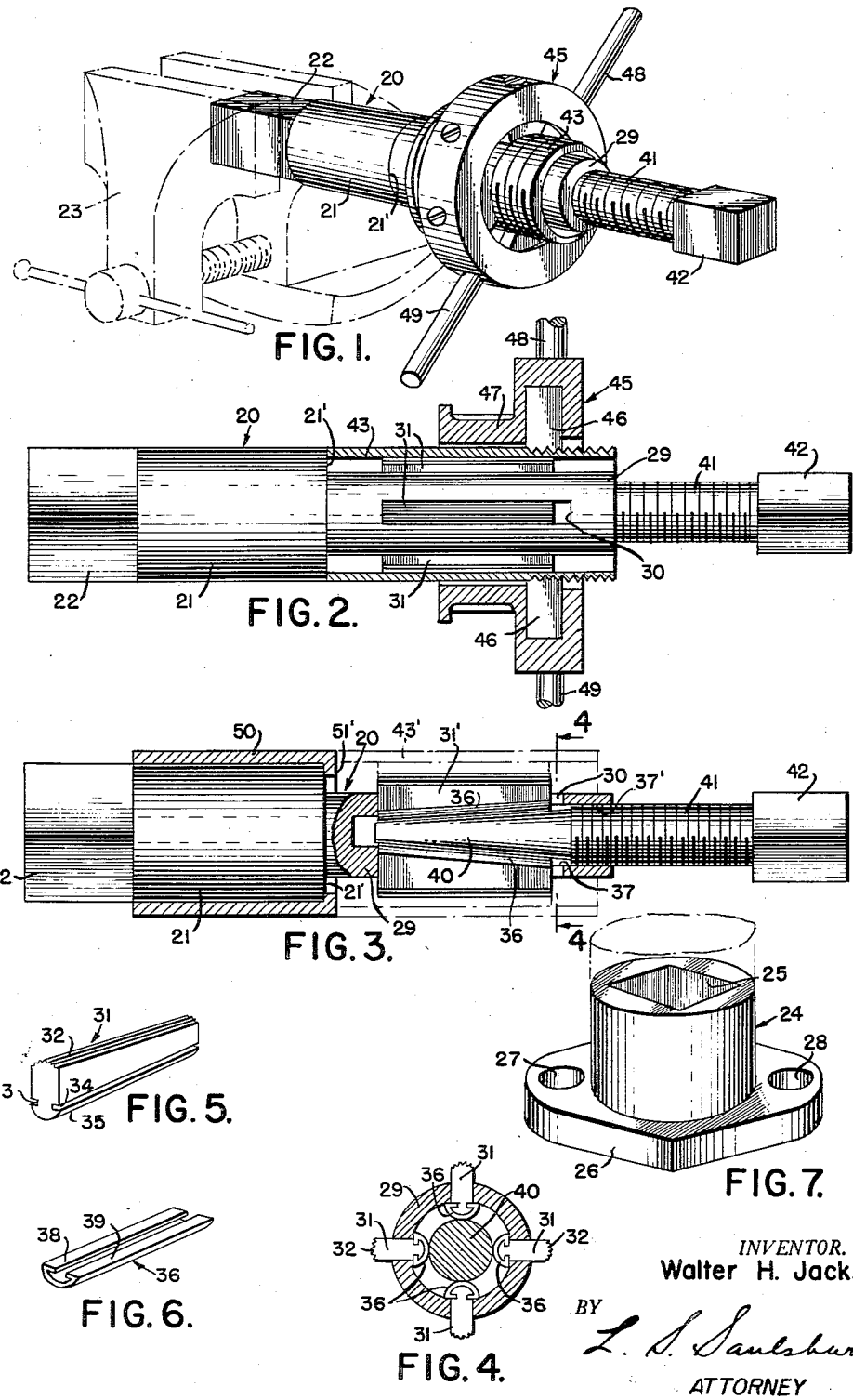
INVENTOR.
Walter H. Jackson
BY
ATTORNEY

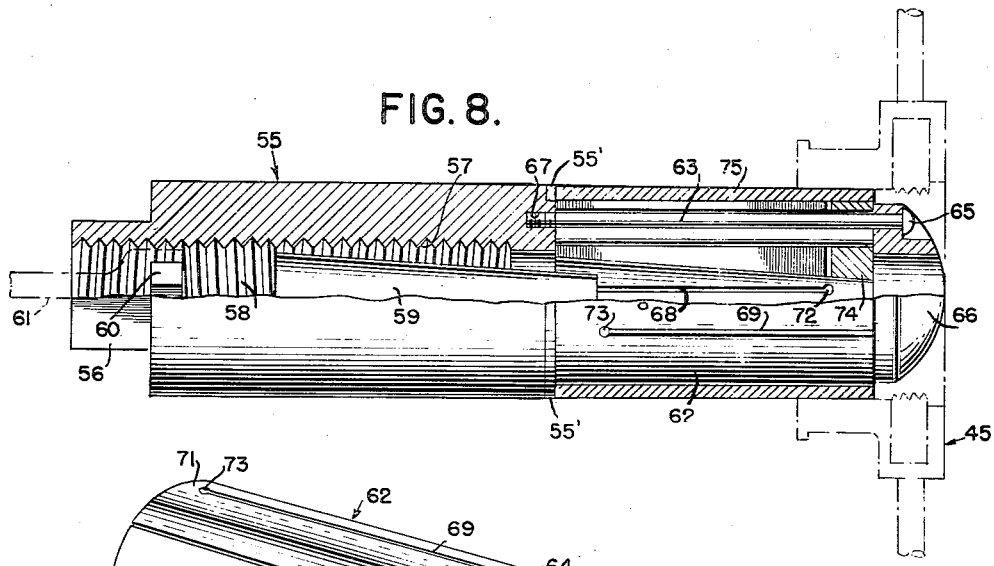
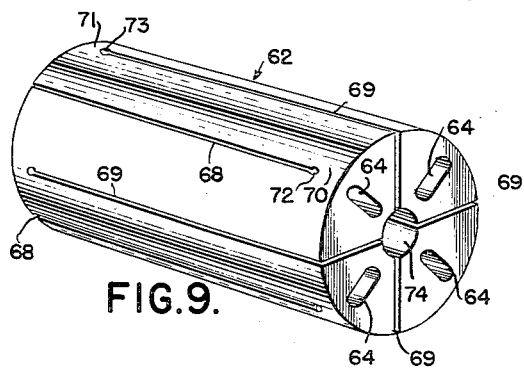
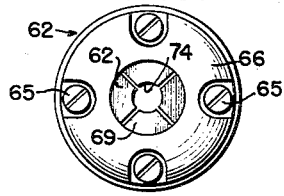
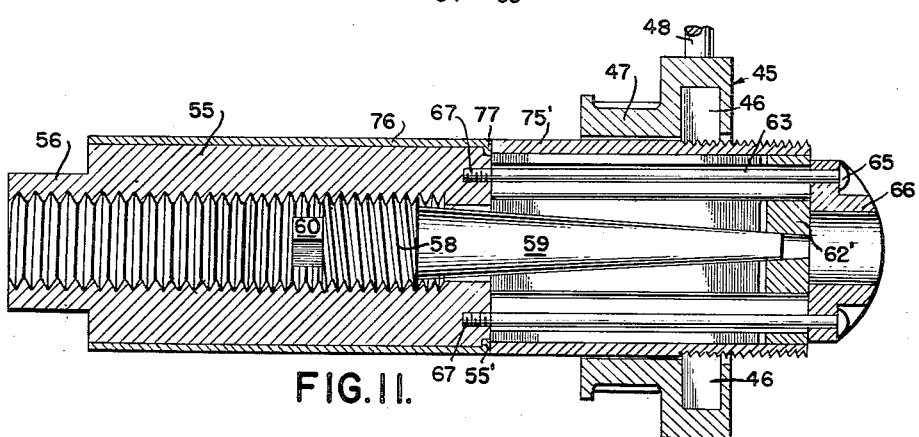

Sept. 2, 1958  W. H. JACKSON  2,850,287
PIPE NIPPLE THREADING JIG
Filed Feb. 3, 1956  3 Sheets-Sheet 3
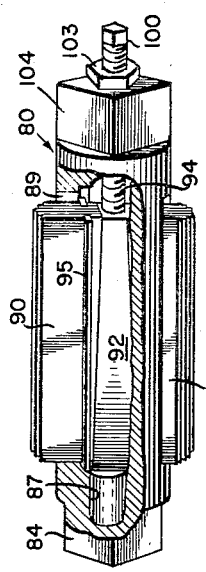
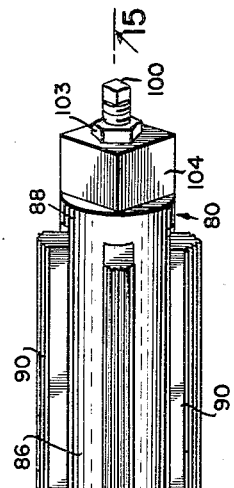
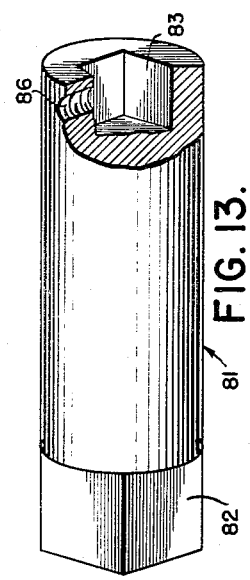
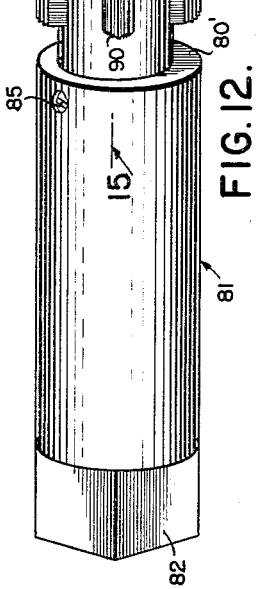
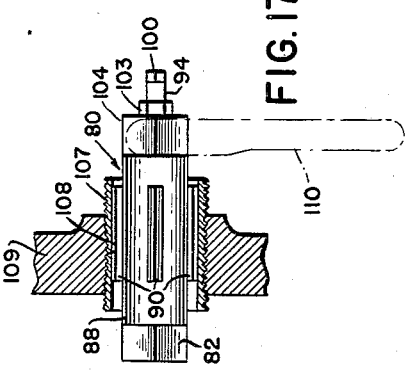
INVENTOR.
Walter H. Jackson
BY
*L. S. Saulsbury*
ATTORNEY

United States Patent Office 2,850,287
Patented Sept. 2, 1958

2,850,287

PIPE NIPPLE THREADING JIG

Walter H. Jackson, Brooklyn, N. Y.

Application February 3, 1956, Serial No. 563,338

5 Claims. (Cl. 279—2)

This invention relates to a pipe nipple threading jig.

It is the principal object of the invention to provide a pipe nipple threading jig which can be easily placed in a vise or a stand on a bench and quickly made ready for hand use, and also can be placed in a lathe or threading machine.

It is another object of the invention to provide a nipple threading jig that can hold precut lengths of pipe without the necessity of first threading one end and thereby permitting the use of otherwise unusable short lengths of pipe.

It is still another object of the invention to provide a nipple threading jig wherein the guide stock is flush with the outside diameter of the nipple piece so that the simple fixed type of threading die may be used and eliminate the need for more expensive and massive adjustable threading dies as required with the more complicated nipple threading and holding devices.

It is still another object of the invention to provide a pipe nipple threading jig that has a simple and quick expanding mechanism for gripping the nipple when placed upon its mandrel or chuck.

It is still another object of the invention to provide a pipe nipple threading jig which can be with the addition of a few parts adapted for use upon nipples of different diameters and lengths, these parts being in the form of replaceable sleeves and gripping jaws adapted to increase the diameter of the jig.

It is still another object of the invention to provide in a nipple threading jig a guide section upon which the thread cutting tool may ride to thereby allow nipples of very short length to be threaded and as well to allow the nipples to be threaded, if desired, throughout their entire length.

It is a further object of the invention to provide in a nipple threading jig an arrangement wherein the chucking jaws can be held when in place by a slide retainer that can be easily removed so that the jaws can be not only held in place against outward displacement as a part of the tool but can be readily replaced with jaws of a different size by simply removing the retainer and tapered mandrel.

It is still a further object of the invention to provide a nipple threading jig which may be readily altered to be used to insert nipples into a housing or extract them therefrom without injury to the nipple.

Other objects of the invention are to provide a nipple threading jig, having the above objects in mind, which is of simple construction, inexpensive to manufacture, has a minimum number of parts, easy to assemble, durable, light in weight and can be carried by the mechanic in his tool kit, efficient and effective in use.

For other objects and for a better understanding of the invention, reference may be had to the following detail description taken in connection with the accompanying drawing, in which Figure 1 is a perspective view of the nipple threading jig constructed according to one form of the invention with illustration being made as to the manner in which it is attached to a vise and with the pipe threading tool being extended thereover to a point where several threads have been applied to a nipple which is retained by this jig, Fig. 2 is a side elevational view of the jig with the nipple and the threading tool being shown in section, Fig. 3 is a side elevational view of the jig adapted for threading a larger diameter nipple, and showing a guide sleeve fitted over the guide section and the chucking section being shown in section with larger size gripping jaws, Fig. 4 is a transverse sectional view taken through the chucking section along line 4—4 thereof, Fig. 5 is an enlarged perspective view of one of the gripping jaws, Fig. 6 is an enlarged perspective view of one of the releasable jaw retainers, Fig. 7 is a perspective view of a jig holder adapted to be fixed to a bench surface and to which the squared end of the jig can be mounted in an upright manner so that the nipple will be held against turning while using the threading tool, Fig. 8 is an elevational view of a nipple threading jig constructed according to another form of the invention with the upper longitudinal portion thereof being broken away and shown in section whereby to show the interior shape of the parts and with illustration being made as to the manner in which the tapered element is tightened by wrench and how the threading tool is applied to the nipple piece retained on the chuck, Fig. 9 is a perspective view of the expansible chuck removed from the guide portion, Fig. 10 is an end elevational view of the nipple threading jig as viewed upon the chucking section end plate thereof, Fig. 11 is a longitudinal sectional view of the jig employing a large chucking section and with an enlarged sleeve placed upon the guide section whereby nipples of larger diameter may be threaded and with the thread cutting tool in place upon the nipple after having cut threads thereupon, Fig. 12 is a side perspective view of the nipple threading jig according to a modified form of the invention in which the guiding and clutching sections are separable from one another so that the clutching section can be used to insert the nipples in a housing or extract them therefrom, Fig. 13 is a perspective view of the guide section with the socket end broken away to show the socket within the end thereof, Fig. 14 is a perspective view of the chucking section separated from the guide sections and with portions broken away to show the interior construction thereof.

Fig. 15 is a longitudinal sectional view of the chucking section taken on line 15—15 of Fig. 12 and looking in the direction of the arrows thereof, Fig. 16 is a collective and perspective view of the jaw and retainer assembly, and Fig. 17 is an elevational view showing the chucking section having a nipple secured thereto and the section being used as a tool for inserting the nipple in a housing or for extracting the same therefrom, a wrench being attached thereto to turn the chucking section.

Referring now particularly to Figures 1 to 6, 20 represents the main body of the jig that comprises a guide section 21 which is squared at one end as indicated at 22 to provide means by which the jig body can be secured in a bench vise 23 as illustrated in Fig. 1 or can be inserted in an upright manner in a holder 24, Fig. 7, that has a square opening 25 for receiving the squared end 22 as illustrated and a flange 26 with holes 27 and 28 therein by which the holder can be fixed to the bench by extending securing screws or bolts through the holes and into the bench surface. The main body 20 further includes a chucking section 29 of less diameter than the guide section 21 that extends forwardly from the other end thereof. This chucking section has a plurality of angularly spaced elongated slots 30 through which there respectively extend gripping jaws 31 that have a serrated rounded outer edge 32 and opposing slots 33 and 34 and a rounded face 35 adapted to accommodate a sleeve retainer 36 that may be inserted into center opening 37 and having inwardly turned lips 38 and 39 adapted to respectively and releasably engage with slots 33 and 34 of the gripping jaws 31. These gripping jaws are inclined on their inner faces so that the retainers 36 have their externally rounded faces longitudinally inclined within the opening 37 and disposed to be engaged by a tapered portion 40 of an adjusting screw 41 having a squared head 42 for receiving a wrench. The outer end of the chucking section is internally threaded at 37' for engagement with the screw. As the screw 41 is tightened and the tapered portion 40 is thrust inwardly so that the gripping jaws 33 engage the inner side of a nipple piece 43 to be threaded in the manner as shown in Figs. 1 and 2. The end of the nipple as shown in Fig. 2 abuts the end of the guide portion 21. A threading tool 45 having cutting elements 46 and a guide sleeve portion 47 may slide along the nipple 43 and onto the guide portion 21 so that the nipple can be threaded throughout its entire length and short nipples can be threaded and the threaded tool still be guided throughout the full cutting operation. Turning handles 48 and 49 are provided on the threading tool 45.

It will be apparent that the nipple 43 will be adequately held on the jig and that jig can be simply and easily mounted in a vise or holder 24, Fig. 1. It will also be apparent that the jig can be retained in a lathe or pipe threading machine and so that the jig is thus adapted for both hand and machine threading operations.

If it is desired to adapt the jig for use in retaining nipples of a larger size, the screw 41 having the tapered end 40 is removed from the opening 37, the loose retainers 36 are slid from the gripping jaws and the gripping jaws are replaced by another set of gripping jaws of larger radial dimension as shown in Fig. 3 so as to adapt them to receive and retain a larger nipple 43'. In order for the guide portion to be enlarged a sleeve 50 is slid onto the guide portion 21 as shown in Fig. 3 so that the flange 50' engages the shoulder 21' whereby to provide an enlarged shoulder upon the guide portion 21. The outer diameter of the sleeve 50 will be the same as the outer diameter of the nipple stock piece 43' so that the larger threading tool used for threading this larger stock piece can be guided by this sleeve 50. The retaining elements, of course, will be extended into the new set of gripping jaws and the threaded screw 41 again threaded into the opening 37 so that its tapered portion 40 will engage with the jaw retainers 36 and the jaw expanded to hold the larger nipple. For still larger sizes of nipples, the sleeves 50 and jaws 31' may still be replaced by larger sleeves and larger jaws.

It will be apparent that the diameter size of nipple pieces that may be accommodated will depend only upon the maximum height of the jaw elements and the degree of taper of the adjusting screw mandrel portion. Thus a single set of jaws may be used for several different nipple piece diameter sizes, but a separate inexpensive guide sleeve must be used for each different outside diameter nipple piece.

Referring now particularly to the form of the invention shown in Figs. 8 to 11, 55 represents a main body that has a squared end 56 and an internally-threaded opening 57 in which there is threaded an expanding screw 58 having a tapered end portion 59 and a squared end 60 adapted to receive a socket wrench illustrated at 61, Fig. 8, by which the screw 58 can be adjusted along the threaded opening 57 so that its tapered end 59 can be extended to a greater or less extent in a spring steel chuck section 62 fixed to the end of the body 55 by long bolts 63.

The chuck section 62 has a plurality of angularly spaced radially widened holes 64 extending from one end of the chuck to the other through which the bolts 63 extend. The bolts 63 have heads 65 adapted to bear against an end plate 66. The shank ends of the bolt are threaded as shown at 67 into the end of the main body member 55. The chuck 62 is opposingly slit from the opposite ends thereof as indicated respectively at 68 and 69 which extend to within short distances of the opposite end faces of the chuck as indicated at 70 and 71. These slots are terminated to these opposite ends by weakening holes 72 and 73 respectively and extend radially into a tapered opening 74 that is aligned with the threaded opening 57 of the main body 55 to receive the tapered end 59 of the adjusting screw 58 so that the portions between the slots 68 and 69 may be expanded upon the tapered portion engaging the inner face of the opening 74. A nipple piece 75 will be retained on the exterior of the chuck 62 in a tight manner so that a threading tool 45 may be applied as illustrated in Fig. 8 to cut a thread upon the nipple piece. The nipple abuts an indented shoulder 55' and the outer diameter of the nipple will be equal to the outer diameter of the main body 55 so that the surface thereof serves to guide the die threading tool as it is applied to a short nipple or where a long thread is being made upon the nipple.

If it is desired to thread a nipple of larger diameter, the screws 63 and chuck 62 are removed and a guide sleeve 76 of desired diameter is placed over the guide section 55. For nipples of such size that the diameter may exceed the range of expansion provided by the tapered mandrel and maximum outside diameter of the existing chuck section, the chuck section may be replaced by another chuck section that differs only in outside diameter all other dimensions being identical to the first chuck. The number of these chucks required will depend upon the range of sizes of nipples which may be required to be threaded. Each chuck section is capable of accommodating several sizes of nipples. However, each nipple size will require a separate guide sleeve 76 consistent with the outside diameter of the nipple piece. As shown in Fig. 11 the guide sleeve 76 has been fitted onto the main body or guide section 55 so that its flange 77 engages with the indented shoulder 55' on the end of the guide section. The sleeve 76 will be of the diameter of the exterior surface of a nipple 75' so that the guide portion 47 of the die threading tool 45 may ride thereover.

It should be apparent that this nipple threading jig can also be retained by its squared end in a vise mounted in a socket 24 shown in Fig. 7, or may be retained in a lathe or threading machine. It also may be used as an inserting and extracting tool. With this modified form of the invention it will thus be seen that the jaws and their retaining sleeves as shown in Fig. 1 have been replaced by a consolidated chuck member that is replaced in its entirety when the jig is to be adapted to larger size nipples, and when upon replacing the same the tapered screw need not be necessarily removed from the chucking section as in the case of the first form of the invention and that it is carried by and may remain in the main body or guide section. Also it will be obvious that with this form of jig the nipple piece will be held in a manner that obviates the possibility of scarring, burring or mushrooming the nipple piece.

Referring now particularly to Figs. 12 to 17, there is shown the form of the invention wherein a chucking section 80 is separable from a guiding section 81 so that it can be used separately to insert nipples into a housing 107 or extract them therefrom. The guide section 81 has a squared end 82 by which the jig can be retained either in a vise or in an upright manner in the socket holder 24 of Fig. 7. The opposite end of the guide section 80 has a squared opening 83 for receiving a squared end 84 of the chucking section 81. The chucking section 81 is held in engagement with the guide section 80 by a set screw 85. This set screw is threadable in a threaded opening 86 in the wall of the squared socket end of the guide section and tightened upon the squared end 84 of the chuck section.

The chuck section 81 has a main body 88 with a central opening 87 that extends from the squared end 84 inwardly through the main body of the section. A plurality of angularly-spaced elongated slots 89 are disposed in the body 88 intermediate its length thereof and they in turn communicate with the central opening 87. Radially-adjustable in these respective elongated slots are replaceable jaws 90 having inclined bottom faces 91 adapted to be engaged by a tapered sleeve 92 having a central threaded opening 93 through which is extended an adjusting screw 94 that extends axially through the body 88 and the tapered sleeve 92. The jaws 90 are held against radial dislodgment from the slots 89 by U-shaped retaining elements 95 which can be inserted through the opening 87 and into recesses 96 and 97 in the opposite jaws 90, Figs. 15 and 16. The outer surfaces of the jaws 90 are curved and serrated as indicated at 98.

The opposite end of the body 88 opposite from the squared end has a threaded recess 99 through which the adjusting screw extends and from which its wrench engaging end 100 projects. This adjusting screw has an enlargement or flange 101 that engages with the bottom of the recess 99 and is held against axial movement within the body 88 by a locking plug 102 having a nut wrench engaging extension 103. Accordingly as the adjusting screw 94 is turned by a wrench engaging the squared end 100 and is held against axial displacement by the locking plug 102, the jaws 90 will be expanded to grip the nipple piece or they may be contracted to release the nipple piece. The end of the body 88 through which the screw 94 extends is also squared as indicated at 104.

The sleeve 92 has four flat tapered sides that engage respectively with the respective jaws 90 and is thereby kept from turning while the adjusting screw 94 is turned.

When the threading jig is to be used in the usual manner as above described in connection with the other forms of the invention, the sections will be secured together and the squared end 82 of the guiding section 81 will be secured to the vise and the nipple piece fitted over the jaws 90 until brought into engagement with end face 80' of the guide section and with the screw 94 adjusted to tighten the jaws, the nipple piece will be retained so that the die threading tool can be extended thereover to thread the nipple and if necessary the guide section 81 will serve to guide the threading tool.

A long nipple 105 can be secured to the chucking section 80 as illustrated in Fig. 15. It will abut end face 80' of the guide section 80 and may extend outwardly beyond the adjusting screw squared end 100. The squared end 100 can then be engaged and turned by a socket wrench 106 extended into the nipple as illustrated.

It will be apparent that with this form of the invention sleeves can be added to the guide section and the jaws replaced by larger jaws whereby the jig can be adapted for a larger size nipple.

If it is desired to use the chucking section as an inserter or extractor, the chucking section 80 is removed from the guide section 81 and the nipple placed thereon in the manner shown in Fig. 17 to effect the insertion of the nipple indicated at 107 into a threaded opening 108 in a housing 109. A wrench as indicated at 110 will have been used to thread the nipple into the housing. If the chucking section is to be used as an extractor the same is inserted into an already installed nipple and clamped to the inner face thereof so that by turning the wrench in the opposite direction, the nipple will be positively extracted and dislodged from the housing.

It should now be apparent that there has been provided a simple nipple threading jig adapted for different size of nipples which will adequately hold and retain the nipple piece while it is being threaded and which can be carried by the mechanic in his tool kit along with his other tools so that a nipple can be prepared on the job from a precut or short scrap piece of pipe stock. It will be further apparent that there has been provided means by which the simple and relatively inexpensive fixed threading dies as distinguished from the massive adjustable dies that are presently required for nipple manufacture can be used.

It is also apparent that by having this jig it does away with the need for the mechanic to carry a large stock of nipples and provide a means for manufacturing on the job nipples of non-standard lengths.

While various changes may be made in the detail construction, it shall be understood that such changes shall be within the spirit and scope of the present invention as defined by the appended claims.

What is claimed is:

1. A pipe nipple threading jig comprising a die threading tool guide section having a squared end thereof adapted for the mounting of a jig in a vise or socket holder and a chucking section extending from the opposite end of the guide section, said chucking section having expansible nipple gripping members adapted to receive a nipple to be threaded and an adjusting screw threadably adjustable in one of the sections and having a tapered portion engageable with the expansible members of the chucking section to expand the same and grip the nipple, the diameter of the guide section being substantially the outer diameter of the nipple piece, said guide section having an end shoulder against which the nipple piece may abut, and said chucking section having a plurality of angularly-spaced elongated slots and an internally threaded opening, said gripping members respectively extended through said slots and having grooves on the opposite sides thereof and releasable slide retainers extendable through the central opening in the chucking section for engagement with the opposite grooves of the gripping members, whereby said gripping members can be readily replaced by other gripping members within the chucking section, and said adjusting screw extending into the end of the chucking section so that its tapered portion engages the retaining elements therewithin.

2. A pipe nipple threading jig as defined in claim 1, and a guide sleeve adapted to be fitted upon the guide section to increase the effective outer diameter thereof, said guide sleeve having an inwardly extending flange adapted to abut the shoulder end of the guide section and upon said gripping members being replaced by larger gripping members the jig may be adapted to receive and retain a larger size nipple blank and the large die threading tool be guided on the guide section.

3. A pipe nipple threading jig comprising a die threading tool guide section having a squared end thereof adapted for the mounting of a jig in a vise or socket holder and a chucking section extending from the opposite end of the guide section, said chucking section having expansible nipple gripping members adapted to receive a nipple to be threaded and an adjusting screw threadably adjustable in one of the sections and having a tapered portion engageable with the expansible members of the chucking section to expand the same and grip the nipple, the diameter of the guide section being substantially the outer diameter of the nipple piece, said guide section having an end shoulder against which the nipple piece may abut, and said chucking section being releasably connected to the guide section and alternately longitudinally slit from the opposite ends of the same to provide weakened expansible gripping members, said chucking section being internally tapered, said adjusting screw being threaded in the guide section and having the tapered end engageable with the internal taper of the chucking section so that upon the screw being adjusted into the chucking section the expansible members thereof will be expanded, said chucking section having longitudinally-extending openings angularly disposed with respect to one another and releasable bolt means engageable with the chucking section and releasably engageable with the guide section to releasably retain the chucking section upon the guide section whereby the chucking section may be replaced by a chucking section of different diameter to support a different size nipple.

4. A pipe nipple threading jig as defined in claim 3, and the diameter of the guide section being greater than the diameter of the chucking section and substantially the outer diameter of the nipple piece, said guide section being adapted to receive an external guide sleeve when adapting the jig for larger size nipples and when replaced with a larger diameter chucking section.

5. A pipe nipple threading jig comprising a die threading tool guide section having a squared end thereof adapted for the mounting of a jig in a vise or socket holder and a chucking section extending from the opposite end of the guide section, said chucking section having expansible nipple gripping members adapted to receive a nipple to be threaded and an adjusting screw threadably adjustable in one of the sections and having a tapered portion engageable with the expansible members of the chucking section to expand the same and grip the nipple, the diameter of the guide section being substantially the outer diameter of the nipple piece, said guide section having an end shoulder against which the nipple piece may abut, and said adjusting screw having a flange, a recess in the outer end of said chucking screw receiving said flange, a locking plug fitted into said recess to retain the flange therein against axial displacement, said tapered portion being adjustable upon the adjusting screw and having flat side portions engageable with the respective gripping members whereby said tapered portion will be held against rotation while being axially adjustable to expand the gripping members.

References Cited in the file of this patent
UNITED STATES PATENTS

| | | |
|---|---|---|
| 1,648,032 | Starkin | Nov. 8, 1927 |
| 1,654,737 | Kistner | Jan. 3, 1928 |
| 1,918,439 | Warman | July 18, 1933 |
| 2,213,379 | Bird et al. | Sept. 3, 1940 |
| 2,469,873 | Ernest | May 10, 1949 |